United States Patent [19]

Lawson

[11] Patent Number: 5,228,787
[45] Date of Patent: Jul. 20, 1993

[54] BEARING ASSEMBLY WITH LOCKING DEVICE

[75] Inventor: James L. Lawson, Spartanburg, S.C.

[73] Assignee: The Torrington Company, Torrington, Conn.

[21] Appl. No.: 905,950

[22] Filed: Jun. 29, 1992

[51] Int. Cl.[5] .............................................. F16C 19/06
[52] U.S. Cl. .................................... 384/535; 384/540
[58] Field of Search ............... 384/535, 540, 513, 585, 384/569, 581

[56] References Cited

U.S. PATENT DOCUMENTS

| | | |
|---|---|---|
| 2,254,397 | 9/1941 | Searles . |
| 3,157,442 | 11/1964 | Gaubatz ............................ 384/540 |
| 3,413,022 | 11/1968 | Waddell ............................ 384/540 |
| 3,880,483 | 4/1975 | Snyder, Jr. . |
| 4,531,847 | 7/1985 | F'Geppert . |
| 4,576,503 | 3/1986 | Orain . |
| 4,893,948 | 1/1990 | Hoch ................................ 384/585 |

Primary Examiner—Lenard A. Footland
Attorney, Agent, or Firm—John C. Bigler

[57] ABSTRACT

A locking collar concentric with an inner ring and outer ring of a bearing assembly is advanced axially by threads or other mechanism on an axial extension of the inner ring. Conical washers between the axial extension and the locking collar are abutted by an abutment surface. Flattening of the conical washers upon advancement of the locking collar grips the shaft. The conical washers may be sued alone or in combination with a wedge ring to lock the bearing assembly to the shaft.

9 Claims, 1 Drawing Sheet

BEARING ASSEMBLY WITH LOCKING DEVICE

BACKGROUND OF THE INVENTION

This invention relates generally to locking devices for interconnecting relatively movable concentric members and, more particularly, to a bearing assembly with a locking device for locking the bearing assembly on a rotatable shaft.

The two most common methods of locking a bearing assembly having inner and outer rings on a rotatable shaft are an eccentric locking collar design and a setscrew design. Each of these methods has drawbacks and causes rotational imbalance and down-rating of the bearing assembly load capacity.

The eccentric locking collar design holds the inner ring against the rotatable shaft at only one location and thus forces the bearing assembly to be eccentric with respect to the rotatable shaft. The amount of eccentricity is equal to the intentional clearance between the rotatable shaft and the bearing assembly. This eccentricity results in movement of the bearing assembly relative to the rotatable shaft as well as fretting of the bearing bore, some cocking of the inner ring of the bearing, and high bending stress on the inner ring. In addition, manufacture of the collar requires expensive eccentric machining.

The setscrew design also pulls the inner ring of the bearing assembly eccentric with respect to the rotatable shaft. The setscrew forces the inner ring out-of-round and puts the inner ring under tensile stress. In addition, the setscrew design may cause a burr on the rotatable shaft and may cause problems due to the presence of loose parts during the manufacturing process.

The foregoing illustrates limitations known to exist in present bearing assemblies with locking devices. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a bearing assembly comprising an outer ring, an inner ring concentric with the outer ring, the inner ring having an axial extension, a locking collar in concentric threaded engagement with the inner ring, and means provided between the inner ring and the locking collar, urged against the rotatable shaft upon threaded advancement of the locking collar with respect to the inner ring.

The foregoing and other aspects will become apparent from the following detailed description of the invention when considered in conjunction with the accompanying drawing figures.

BRIEF DESCRIPTION OF THE DRAWING FIGURES

FIG. 1 is a side view, partially in cross-section, illustrating an embodiment of the bearing assembly with locking device of the present invention, as mounted on a rotatable shaft; and FIG. 2 is a partial cross-sectional view illustrating another embodiment of the bearing assembly with locking device of the present invention, as mounted on a rotatable shaft.

DETAILED DESCRIPTION

Figure 1:
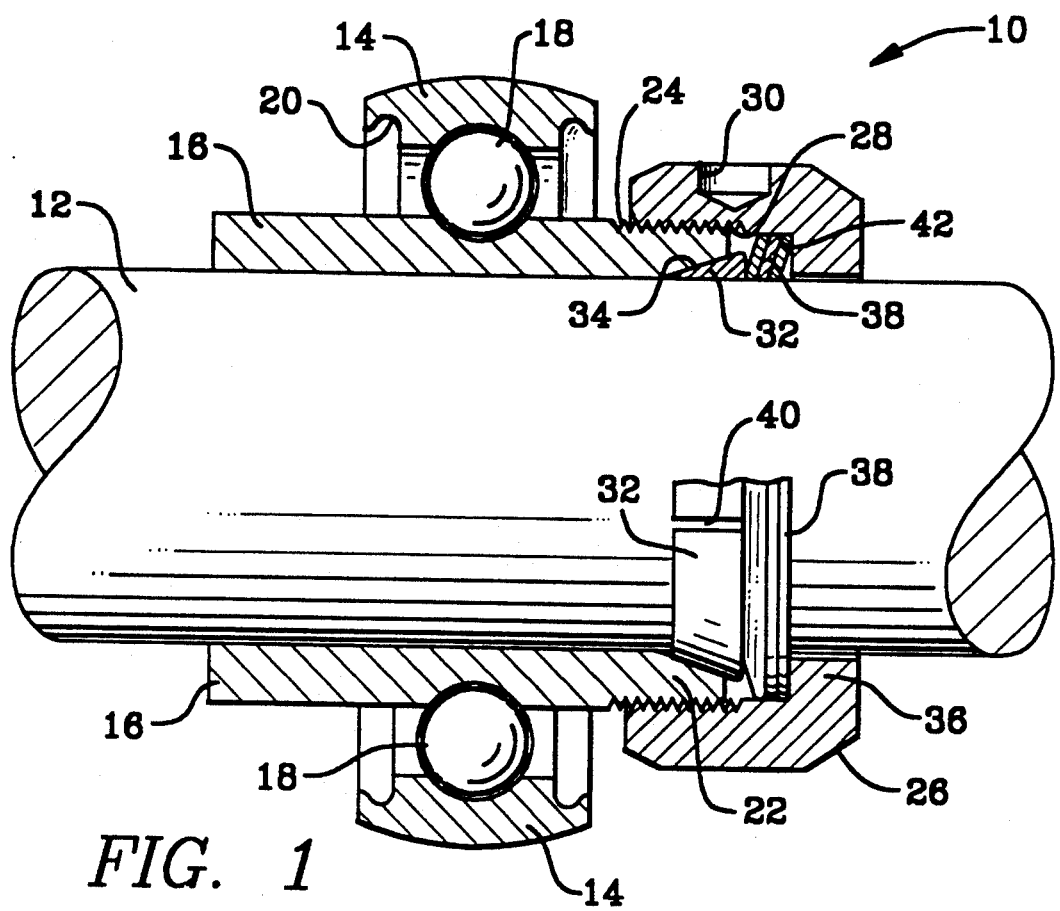

In this specification, identical elements in different embodiments are given identical reference numerals.

Referring now to the drawings, FIG. 1 illustrates a bearing assembly 10 mounted on a rotatable shaft 12. Bearing assembly 10 includes an outer ring 14, an inner ring 16 concentric with the outer ring 14, and rolling members 18 within the annulus between outer ring 14 and inner ring 16. Typically, inner ring 16 forms a loose fit with rotatable shaft 12 to facilitate positioning the bearing assembly 10 thereon.

Although bearing assembly 10 is illustrated as having a ball bearing, the bearing assembly with locking device is equally suited to other types of bearings. Rolling members 18 may be rollers, either tapered or cylindrical, or rolling members 18 may be deleted in favor of a plain bearing with outer ring 14 sliding over inner ring 16, either with or without a sleeve. The bearing may include a cage or retainer (not shown) for rolling members 18. As illustrated, outer ring 14 includes grooves 20 for retaining bearing seals (not shown).

Inner ring 16 has an axial extension 22 with external threads 24. A locking collar 26 concentric with inner ring 16 has internal threads 28 in engagement with external threads 24 to axially advance locking collar 26 over axial extension 22 upon rotation of locking collar 26 relative to inner ring 16. Other advancement means for providing the axial advancement of locking collar 26 over axial extension 22, such as cams, screws or clamps, for example, may also be used.

Locking collar 26 is provided with a drift pin hole 30 to facilitate an angle blow with a drift to drive locking collar 26 rotatably with respect to rotatable shaft 12. Other means for rotating locking collar 26, such as wrench flats or a hexagonal shape for receiving a wrench, may be used. However, because rotatable shaft 12 if free to rotate in many bearing assembly applications, a blow with a drift or other impact tool may avoid the need to secure rotatable shaft 12 before mounting bearing assembly 10.

A wedge ring 32 is positioned between axial extension 22, rotatable shaft 12 and locking collar 26. Wedge ring 32 is substantially a right-triangle in cross-section, having a hypotenuse side 34 projecting outward at an angle of approximately 15 degrees from rotatable shaft 12. Other angles, preferably from 10 to 30 degrees, could also be used. Wedge ring 32 mates with a tapered surface of the bore of axial extension 22 at an angle corresponding to that of hypotenuse side 34.

The thicker portion of wedge ring 32 is located axially outward of axial extension 22 and is pushed axially toward axial extension 22 by thread-wise advancement of locking collar 26 over axial extension 22. A radially inwardly extending flange portion 36 pushes conical washers 38 against wedge ring 32, driving the thin portion of wedge ring 32 into the tapered bore of axial extension 22 as locking collar 26 is advanced to a locking position. Flange portion 36 has a bore larger than the diameter of rotatable shaft 12 to allow relative rotation of locking collar 26.

Preferably, before locking of bearing assembly 10, wedge ring 32 has a bore larger than the diameter of rotatable shaft 12 to facilitate ease of positioning of bearing assembly 10. Also, wedge ring 32 is split, that is, ends 40 leave a gap, thereby facilitating radially inward movement of wedge ring 32 against rotatable shaft 12 as locking collar 26 is advanced, thereby gripping rotatable shaft 12 along its full 360 degree circumference. The gap may be in a longitudinal plane including the axis of inner ring 16, as shown, or may be of various other configurations.

Conical washers 38 have an inner diameter greater than the diameter of rotatable shaft 12 and an outer diameter matching the inner diameter of a cylindrical seat 42 of locking collar 26. As locking collar 26 is advanced over axial portion 22, pushing conical washers 38 against wedge ring 32, conical washers 38 are partially flattened. Because the outer diameters are constrained by cylindrical seat 42, the inner diameters are decreased during the flattening such that conical washers 38 grip rotatable shaft 12 along a full 360 degree circumference.

In the embodiment shown in FIG. 1, the number of conical washers 38 is 3. Preferably, 2 to 5 conical washers 38 are used; however, any convenient number may be used. A single conical washer 38 will provide the desired locking effect, but additional washers permit a clutch-like sliding action and increase the surface area that is gripped by the washers. It will be understood that the locking effect is combination of the wedging of wedge ring 32 between axial extension 22 and rotatable shaft 12 and the flattening of conical washers 38 against rotatable shaft 12.

Wedge ring 32 may be used without any conical washers 38. In that embodiment (not shown), flange portion 36 directly abuts wedge ring 32 and drives wedge ring 32 between axial portion 22 and rotatable shaft 12 as collar 26 is advanced, thereby gripping rotatable shaft 12 to lock bearing assembly 10 in position.

Figure 2:
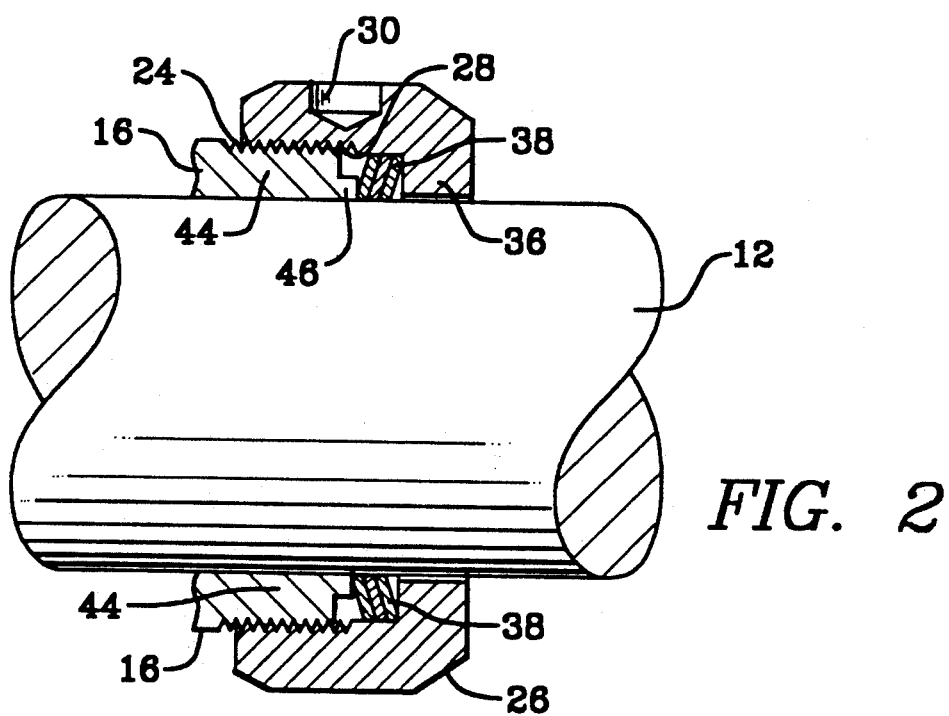

Another embodiment, illustrated in FIG. 2, employs conical washers 38 without wedge ring 32. Axial extension 44 does not have a tapered bore as axial extension 22 of the first embodiment but, instead, has a projection, such as for example tubular extension 46, adjacent rotatable shaft 12. Advancement of collar 26 over axial extension 44 flattens conical washers 38 between tubular extension 46 and flange portion 36, thereby gripping rotatable shaft 12 and locking bearing assembly 10 without use of wedge ring 32.

In each of these embodiments, it is preferred that outer threads 24 form an interference fit with inner threads 28 to prevent unintentional unscrewing of collar 26 from axial extension 22. Such interference fit places inner ring 22 or 44 in compression and reduces the intentional loose clearance between rotatable shaft 12 and the bore of inner ring 22 or 44. The desired locking action is controlled by selection of spring rates of conical washers 38 and by dimensioning of the mechanical members.

Unlike previously used locking devices, the present invention allows a bearing assembly with locking device to have the full load rating as the included bearing. The bearing assembly spreads high locking forces over the full 360 degree circumference of the rotatable shaft. Eccentricity of the bearing assembly with respect to the shaft is reduced and misalignment of the inner ring is avoided. The bearing assembly does not cause out-of-roundness of the inner ring and reduces fretting.

In addition, manufacture is more economical than an eccentric locking collar design because eccentric machining operations are not required and numerical control equipment may be used. Assembly operations are simplified because no loose parts are required. The bearing assembly does not cause rotational imbalance and can operate at high speeds. The locking device fits existing envelopes, is easy to install and remove, and does not burr the shaft.

Having described the invention, what is claimed is:

1. A bearing assembly with a locking device for mounting on a rotatable shaft, the bearing assembly comprising:
   an outer ring;
   an inner ring concentric with the outer ring, the inner ring having an axial extension;
   a locking collar concentic with the inner ring;
   advancement means on the axial extension of the inner ring and the locking collar for advancing the locking collar axially with respect to the inner ring;
   at least one conical washer between the axial extension of the inner ring and the locking collar; and
   abutment means for abutting the conical washer upon advancement of the locking collar by the advancement means such that flattening of the conical washer results, thereby gripping the rotatable shaft.

2. The bearing assembly according to claim 1, wherein the number of conical washers is between 2 and 5, inclusive.

3. The bearing assembly according to claim 1, wherein the outside perimeter of the washers is within an inside surface of the locking collar such that the washers are constrained radially inwardly during flattening of the conical washers.

4. The bearing assembly according to claim 1, wherein the abutment means comprises an end surface of the axial extension of the inner ring.

5. The bearing assembly according to claim 1, wherein the advancement means comprises thread means for threaded engagement of the locking collar with the axial extension of the inner ring.

6. The bearing assembly according to claim 1, wherein the abutment means comprises wedge means between the axial extension of the inner ring and the rotatable shaft for abutting one of the conical washers and for providing a wedge between the axial extension of the inner ring and the rotatable shaft upon advancement of the locking collar by the advancement means.

7. The bearing assembly according to claim 1, wherein the wedge means comprises a split wedge ring.

8. The bearing assembly according to claim 7, wherein the split wedge ring is substantially a right triangle in cross-section, the hypotenuse thereof forming a wedge angle of between 10 degrees and 30 degrees, inclusive, and mating with an internal conical surface of the axial extension of the inner ring.

9. The bearing assembly according to claim 7, wherein the split wedge ring has a single split, the split being formed by the ends of the ring leaving a gap aligned in a longitudinal plane including the axis of the inner ring.

* * * * *